US008923274B2

(12) United States Patent
Wang et al.

(10) Patent No.: US 8,923,274 B2
(45) Date of Patent: Dec. 30, 2014

(54) NOTIFYING A UL/DL CONFIGURATION IN LTE TDD SYSTEMS

(75) Inventors: Yiping Wang, Allen, TX (US); Jun Li, Richardson, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 214 days.

(21) Appl. No.: 13/210,066

(22) Filed: Aug. 15, 2011

(65) Prior Publication Data

US 2013/0044652 A1 Feb. 21, 2013

(51) Int. Cl.
*H04L 12/28* (2006.01)
*H04W 72/04* (2009.01)

(52) U.S. Cl.
CPC .................. *H04W 72/0406* (2013.01)
USPC ........................................ 370/351

(58) Field of Classification Search
CPC ..... H04L 5/0053; H04L 5/001; H04L 5/0007; H04L 1/0027; H04L 1/1854; H04L 1/1887; H04L 5/0003; H04W 72/04; H04W 72/042; H04W 72/005
USPC ........... 370/351, 395.1, 395.2, 395.4, 395.41, 370/395.21, 464, 465, 468; 379/111, 379/114.01, 114.06, 114.07; 455/403, 455/422.1, 450, 452.2, 452.1
See application file for complete search history.

(56) References Cited

U.S. PATENT DOCUMENTS

| 7,957,329 | B2 | 6/2011 | Ahn et al. | |
| 2010/0172272 | A1* | 7/2010 | Tenny | 370/280 |
| 2011/0007673 | A1* | 1/2011 | Ahn et al. | 370/280 |
| 2011/0090808 | A1* | 4/2011 | Chen et al. | 370/252 |
| 2011/0228732 | A1 | 9/2011 | Luo et al. | |
| 2011/0268056 | A1 | 11/2011 | Soong et al. | |
| 2012/0276916 | A1* | 11/2012 | Kazmi et al. | 455/452.1 |
| 2012/0307776 | A1 | 12/2012 | Hong et al. | |
| 2013/0044651 | A1* | 2/2013 | Wang et al. | 370/280 |
| 2013/0044652 | A1* | 2/2013 | Wang et al. | 370/280 |

FOREIGN PATENT DOCUMENTS

| WO | 2009/116751 | 9/2009 |
| WO | 2010/075678 | 7/2010 |
| WO | 2011/038272 | 3/2011 |

OTHER PUBLICATIONS

3GPP TS 36.212 V10.2.0 (Jun. 2011); "Third Generation Partnership Project; Technical Specification Group Radio Access Network; Evolved Universal Terrestrial Radio Access (E-UTRA); Multiplexing and Channel Coding (Release 10)"; vol. RAN WG1, No. V10.2.0; Jun. 21, 2011; 78 pages.

(Continued)

*Primary Examiner* — Fan Ng
(74) *Attorney, Agent, or Firm* — Fish & Richardson P.C.

(57) ABSTRACT

A method for configuring a Time Division Duplex (TDD) Uplink/Downlink (UL/DL) allocation in a user equipment (UE) in a Long Term Evolved (LTE) network can include receiving, at a predefined period, during a connected state, each information block transmitted by an enhanced NodeB in the LTE network. Each information block may be transmitted in accordance with a fixed schedule having a predefined transmission period and includes information identifying a TDD configuration. Whether an updating of the TDD configuration is required can be determined for the UE based, at least in part, on the information identifying the TDD configuration in the information block, the information identifying the TDD configuration indicating an updated TDD configuration. In response to at least identifying the updated TDD configuration, the TDD UL/DL allocation of the UE can be automatically updated in accordance with the updated TDD configuration.

44 Claims, 10 Drawing Sheets

(56) References Cited

OTHER PUBLICATIONS

3GPP TS 36.331 V10.2.0 (Jun. 2011); "3rd Generation Partnership Project; Technical Specification Group Radio Access Network; Evolved Universal Terrestrial Radio Access (E-UTRA); Radio Resource Control (RRC); Protocol Specification (Release 10)"; vol. RAN WG2, No. V10.2.0; Jun. 24, 2011; 294 pages.

International Search Report and Written Opinion of the International Searching Authority issued in International Application No. PCT/US2012/004831 on Sep. 12, 2012; 11 pages.

International Search Report and Written Opinion of the International Searching Authority issued in International Application No. PCT/US2012/044827 on Sep. 12, 2012; 12 pages.

Office Action issued in U.S. Appl. No. 13/210,033 on May 15, 2013; 6 pages.

Office Action issued in U.S. Appl. No. 13/210,033 on Sep. 5, 2013; 7 pages.

Office Action issued in U.S. Appl. No. 13/210,033 on Nov. 27, 2013; 9 pages.

* cited by examiner

NOTIFYING A UL/DL CONFIGURATION IN LTE TDD SYSTEMS

TECHNICAL FIELD

This disclosure pertains to time division duplex configurations in Long Term Evolution (LTE) environments.

BACKGROUND

In LTE systems, downlink and uplink transmissions may be organized into two duplex modes: frequency division duplex (FDD) mode and time division duplex (TDD) mode. The FDD mode uses a paired spectrum where the frequency domain is used to separate the uplink (UL) and downlink (DL) transmission. FIG. 1A is a graphical illustration of an uplink and downlink subframe separated in the frequency domain for the FDD mode. In TDD systems, an unpaired spectrum may be used where both UL and DL are transmitted over the same carrier frequency. The UL and DL are separated in the time domain. FIG. 1B is a graphical illustration of an uplink and downlink subframe sharing a carrier frequency in the TDD mode.

DETAILED DESCRIPTION

Figure 1B:
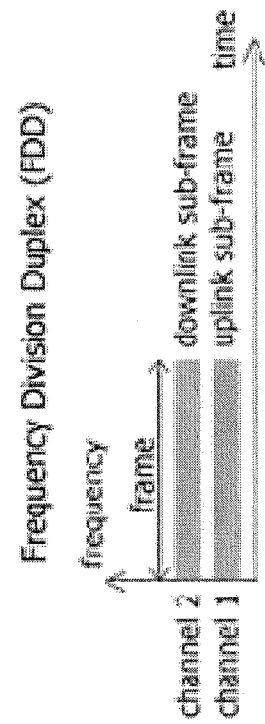
FIG. 1B is a graphical illustration of an uplink and downlink subframe sharing a carrier frequency in the TDD mode.
Figure 1A:
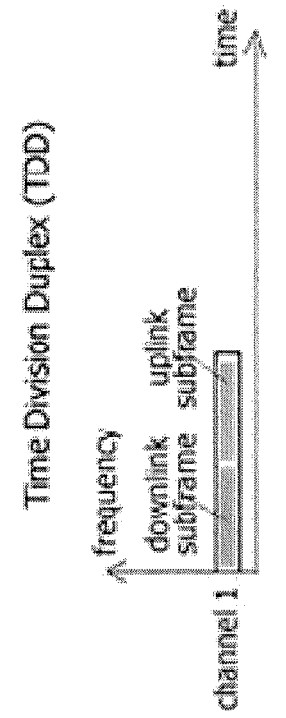
FIG. 1A is a graphical illustration of an uplink and downlink subframe separated in the frequency domain for the FDD mode.

An LTE TDD system may be enabled to notify a TDD UL/DL configuration (or configuration change) to the UE more frequently. The system may be able to re-allocate the radio resource between UL and DL to meet requirements associated with, e.g., traffic conditions. In an LTE TDD system, a subframe of a radio frame can be a downlink (DL), an uplink (UL), or a special subframe. The special subframe comprises downlink and uplink time regions separated by a guard period for downlink to uplink switching, and includes three parts: i) the downlink pilot time slot (DwPTS), ii) the uplink pilot time slot (UpPTS), and iii) the guard period (GP). Seven different UL/DL configuration schemes in LTE TDD operations are listed in Table 1. In Table 1, D represents downlink subframes, U is for uplink subframes and S is the special frame.

TABLE 1

LTE TDD Uplink-downlink configurations

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As shown in Table 1, there are two switching point periodicities specified in the LTE standard: 5 ms and 10 ms. The 5 ms switching point periodicity can support the co-existence between LTE and low-chip-rate Universal Terrestrial Radio Access (UTRA) TDD systems, and 10 ms switching point periodicity can support the coexistence of LTE and high-chip-rate UTRA TDD systems. The supported configurations cover a wide range of UL/DL allocations from a DL-heavy configuration (9:1 ratio DL:UL) to a UL heavy configuration (2:3 ratio DL:UL). TDD systems have flexibility in terms of the proportion of resources assignable to uplink and downlink communications within a given assignment of spectrum. Specifically, it is possible to distribute the radio resource unevenly between uplink and downlink to provide a way to utilize radio resources more efficiently by selecting a UL/DL configuration based on, for example, different traffic characteristics in DL and UL.

In some embodiments, the Master Information Block (MIB) may be used to indicate the TDD configuration. In some instances, there may be ten spare bits in the MIB. Some of the spare bits may be used for a TDD configuration indicator. In certain implementation, the MIB uses a fixed schedule (e.g., every 40 milliseconds), and communicating TDD configuration using the MIB spare bits can increase the TDD configuration identification frequency as fast as once every 40 milliseconds, in certain embodiments.

In another example embodiment, the System Information Block Type 1 (SIB1) can be updated when there is a need for a configuration change. When the system identifies a need for a configuration change, it can update the TDD-Config Information Element (IE) in SIB1 for the next 80 millisecond transmission period. The UE can read the SIB1 every 80 ms.

In some embodiments, the TDD configuration indicator can be scrambled onto a control format indicator (CFI) on the physical control format indicator channel (PCFICH). A current CFI code word can be scrambled by the TDD configuration change indicator. Since the PCFICH is transmitted on a subframe basis, it will enable the dynamic change of the TDD configuration.

In some embodiments, a physical downlink control channel (PDCCH) can be used to notify the TDD configuration. A DCI format can be introduced that will be transmitted on the common search space. A Radio Network Temporary Identifier (RNTI), called TDD-RNTI, may be used to scramble the cyclic redundancy check (CRC) for the search purpose. The dynamic change of the TDD configuration is provided because the PDCCH is transmitted every subframe.

In some embodiments, a dedicated signaling to connected mode UEs can be used. A dedicated signaling message (for example, a Radio Resource Control (RRC) Connection Reconfiguration) containing a TDD-Config IE can be used to communicate an updated TDD configuration to a connected mode UE. The network may send this dedicated message to all UEs in RRC connected mode. In addition, the TDD configuration within SIB1 is also updated in order to provide the information to idle mode UEs.

Figure 2:
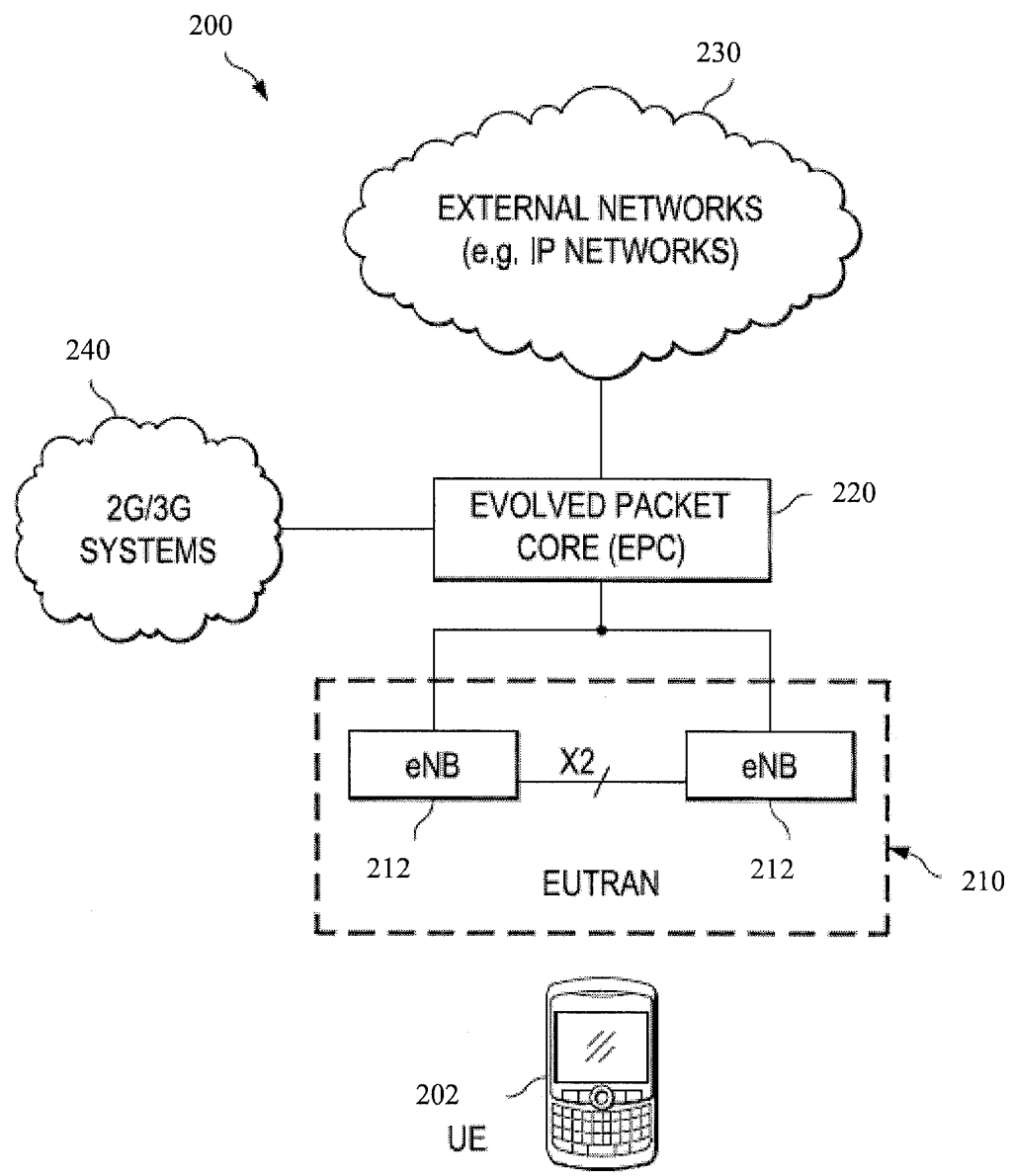
FIG. 2 is a schematic representation of an example wireless cellular communication system based on 3GPP LTE.

The user equipment described above may operate in a cellular network, such as the network shown in FIG. 2, which is based on the third generation partnership project (3GPP) long term evolution (LTE), also known as Evolved Universal Terrestrial Radio Access (E-UTRA). More specifically, FIG. 2 is a schematic representation of an example wireless cellular communication system 200 based on 3GPP LTE. The cellular network system 200 shown in FIG. 2 includes a plurality of base stations 212. In the LTE example of FIG. 2, the base stations are shown as enhanced Node B (eNB) 212. It will be understood that the base station may operate in any mobile environment, including femto-cell or pico-cell, or the base station may operate as a node that can relay signals for other mobile and/or base stations. The example LTE telecommunications environment 200 of FIG. 2 may include one or a plurality of radio access networks 210, core networks (CNs) 220 (shown as an Evolved Packet Core (EPC) 220), and external networks 230. In certain implementations, the radio access networks may be Evolved Universal Mobile Telecommunications System (UMTS) terrestrial radio access networks (EUTRANs). In addition, in certain instances, core networks 220 may be evolved packet cores (EPCs). Further, there may be one or more user equipment 202 operating within the LTE system 200. In some implementations, 2G/3G systems 240, e.g., Global System for Mobile communication (GSM), Interim Standard 95 (IS-95), Universal Mobile Telecommunications System (UMTS) and CDMA2000 (Code Division Multiple Access) may also be integrated into the LTE telecommunication system 200.

In the example LTE system shown in FIG. 2, the EUTRAN 210 includes eNB 212. UE 202 may operate in a cell serviced by one of eNB 212. The EUTRAN 210 can include one or a plurality of eNBs 212 and one or a plurality of UEs 202 can operate in a cell. The eNBs 212 communicate directly to the UEs 202. In some implementations, the eNB 212 may be in a one-to-many relationship with the UE 202, e.g., eNB 212 in the example LTE system 200 can serve multiple UEs 202 within its coverage area, but each UE 202 may be connected only to one eNB 212 at a time. In some implementations, the eNB 212 may be in a many-to-many relationship with the UEs 202. The eNBs 212 may be connected to each other, and a UE handover may be conducted if a UE 202 travels from one eNB 212 to another eNB. UE 202 may be any wireless electronic device used by an end-user to communicate, for example, within the LTE system 200. The UE 202 may be referred to as mobile electronic device, user device, mobile station, subscriber station, or wireless terminal. UE 202 may be a cellular phone, personal data assistant (PDA), smart phone, laptop, tablet personal computer (PC), pager, portable computer, or other wireless communications device.

In the uplink, an uplink data signal is transmitted via e.g., the Physical Uplink Shared Channel (PUSCH), and an uplink control signal is transmitted via e.g., Physical Uplink Control Channel (PUCCH). In the downlink, a synchronization signal is transmitted via, e.g., Synchronization Channel (SCH), a downlink data signal is transmitted via, e.g., Physical Downlink Shared Channel (PDSCH), and a downlink control signal is transmitted via e.g., Physical Downlink Control Channel (PDCCH). A MasterInformationBlock (MIB) may be configured to be transmitted as broadcast information in each cell via e.g., a Physical Broadcast Channel (PBCH), and SystemInformationBlock (SIB) 1 to 11 are configured to be transmitted via e.g., PDSCH.

The MIB may be configured to include physical parameters such as a cell bandwidth and transmission antenna identification information, and a system frame number (SFN), and is configured to be transmitted in a period of 40 ms. The SIB1 may be configured to be transmitted in a period of 80 ms.

Figure 3:
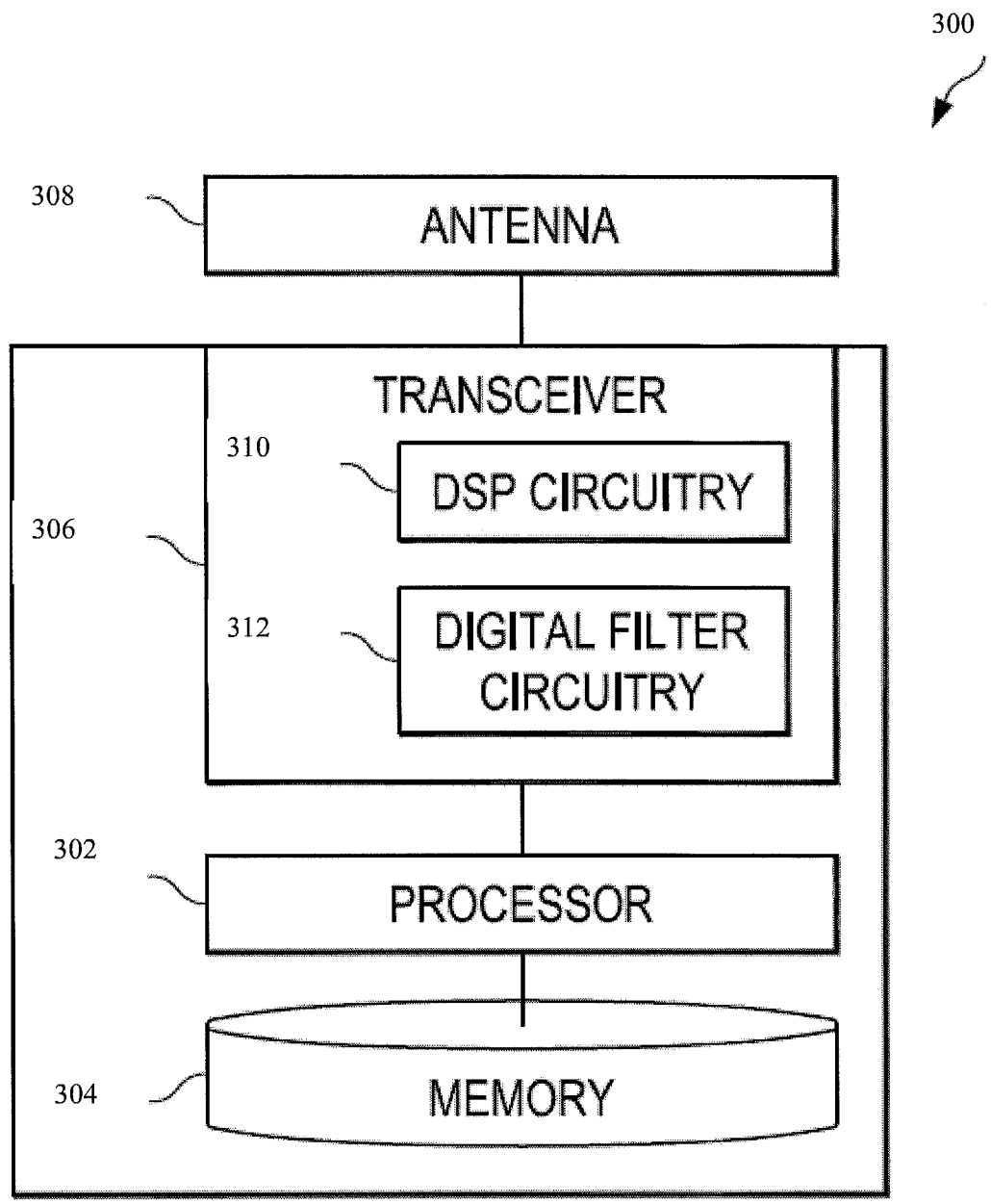
FIG. 3 is a schematic illustration of an example wireless station.

Turning briefly to FIG. 3, each wireless station may be any electronic device operable to transmit and receive wireless signals in the LTE telecommunication system 200. In the present disclosure, a wireless station can be either a mobile electronic device (e.g., UE) or a base station (e.g., an eNB). FIG. 3 is a schematic illustration of an example wireless station 300. A wireless station 300 may include a processor 302, a memory 304, a wireless transceiver 306, and an antenna 308. The processor 302 may comprise a microprocessor, central processing unit, graphic control unit, network processor, or other processor for carrying out instructions stored in memory 304. The functions of the processor 302 may include computation, queue management, control processing, graphic acceleration, video decoding, and execution of a sequence of stored instructions from the program kept in the memory module 304. In some implementations, the processor 302 may also be responsible for signal processing including sampling, quantizing, encoding/decoding, and/or modulation/demodulation of the signal. The memory module 304 may include a temporary state device (e.g., random-access memory (RAM)) and data storage. The memory module 304 can be used to store data or programs (i.e., sequences of instructions) on a temporary or permanent basis for use in a UE.

The wireless transceiver 306 can include both the transmitter circuitry and the receiver circuitry. The wireless transceiver 306 may be responsible for converting a baseband signal to a passband signal or vice versa. The components of the wireless transceiver 306 may include a digital-to-analog converter/analog-to-digital converter, amplifier, frequency filter, and oscillator. In addition, the wireless transceiver 306 may also include or be communicably coupled to a digital signal processing (DSP) circuitry 310 and a digital filter circuitry 312. The DSP circuitry 310 may perform functionalities includes generating Orthogonal Frequency Division Multiplexing (OFDM) and/or single carrier—frequency division multiple access (SC-FDMA) signals. OFDM is a frequency division multiplexing technology used as a multiple subcarrier modulation method. OFDM signal can be generated by modulating an information bearing signal, e.g., a sequence of bit-mapped symbols, on multiple orthogonal subcarriers. Different bit-mapped symbols modulated on different subcarriers may each be considered to experience a flat fading channel, i.e., the frequency response of a fading channel for each subcarrier can be considered flat, such that the information may be easier to decode at the receiver. In some practical implementations, OFDM uses fast Fourier transform (FFT) and inverse fast Fourier transform (IFFT) to alternate between time and frequency domain representations of the signal. The FFT operation can convert the signal from a time domain representation to a frequency domain representation. The IFFT operation can do the conversion in the opposite direction. While OFDM may be used in the radio downlink, SC-FDMA technology may be used in the radio uplink. SC-FDMA uses substantially similar modulation scheme as OFDM to modulate uplink signal to multiple subcarriers. Among other differences with OFDM, a multi-point Discrete Fourier Transform (DFT) operation is performed before subcarrier mapping and IFFT in SC-FDMA on the transmitter side in order to reduce peak-to-average power ratio of the modulated signal. Since uplink signals are transmitted from UEs, a lower peak-to-average power ratio of the modulated signal may result in a lower cost signal amplification at UEs.

The digital filter circuitry 312 may include an equalization filter that is used for signal equalization. Equalization can be the process of adjusting the balance between frequency components within a radio signal. More specifically, equalizers may be used to render the frequency response flat from the transmitter to the equalized output and within the entire channel bandwidth of interest. When a channel has been equalized, the frequency domain attributes of the signal at the equalized output may be substantially similar to those of the transmitted signal at the transmitter. An equalizer may include one or more filter taps, each tap may correspond to a filter coefficient. The filter coefficients may be adjusted according to the variation of channel/system condition.

The antenna 308 is a transducer which can transmit and/or receive electromagnetic waves. Antenna 308 can convert electromagnetic radiation into electric current, or vice versa. Antenna 308 is generally responsible for the transmission and reception of radio waves, and can serve as an interface between the transceiver 306 and the wireless channel. In some implementations, the wireless station 300 may be equipped with more than one antenna to take advantage of multiple-input-multiple-output (MIMO) technology. MIMO technology may provide a process to utilize multiple signal paths to reduce the impact of multipath fading and/or to improve the throughput. By using multiple antennas at a wireless station, MIMO technology may enable a transmission of multiple parallel data streams on the same wireless channel, thereby increasing the throughput of the channel.

Returning to the illustration of FIG. 2, UEs 202 may transmit voice, video, multimedia, text, web content and/or any other user/client-specific content. On the one hand, the transmission of some of these contents, e.g., video and web content, may require high channel throughput to satisfy the end-user demand. On the other hand, the channel between UEs 202 and eNBs 212 may be contaminated by multipath fading, due to the multiple signal paths arising from many reflections in the wireless environment. Accordingly, the UEs' transmission may adapt to the wireless environment. In short, UEs 202 generate requests, send responses, or otherwise communicate in different means with Evolved Packet Core (EPC) 220 and/or Internet Protocol (IP) networks 230 through one or more eNBs 212.

A radio access network (RAN) is part of a mobile telecommunication system which implements a radio access technology, such as UMTS, CDMA2000 and 3GPP LTE. In many applications, the RAN included in an LTE telecommunications system 200 is called an EUTRAN 210. The EUTRAN 210 can be located between UEs 202 and EPC 220. The EUTRAN 210 includes at least one eNB 212. The eNB can be a radio base station that may control all or at least some radio related functions in a fixed part of the system. The at least one eNB 212 can provide radio interface within their coverage area or a cell for UEs 202 to communicate. eNBs 212 may be distributed throughout the cellular network to provide a wide area of coverage. The eNB 212 directly communicates with one or a plurality of UEs 202, other eNBs, and the EPC 220.

The eNB 212 may be the end point of the radio protocols towards the UE 202 and may relay signals between the radio connection and the connectivity towards the EPC 220. In certain implementations, the EPC 220 is the main component of a core network (CN). The CN can be a backbone network, which may be a central part of the telecommunications system. The EPC 220 can include a mobility management entity (MME), a serving gateway (SGW), and a packet data network gateway (PGW). The MME may be the main control element in the EPC 220 responsible for the functionalities comprising the control plane functions related to subscriber and session management. The SGW can serve as a local mobility anchor, such that the packets are routed through this point for intra EUTRAN 210 mobility and mobility with other legacy 2G/3G systems 240. The SGW functions may include the user plane tunnel management and switching. The PGW may provide connectivity to the services domain comprising external networks 230, such as the IP networks. The UE 202, EUTRAN 210, and EPC 220 are sometimes referred to as the evolved packet system (EPS). It is to be understood that the architectural evolvement of the LTE system 200 is focused on the EPS. The functional evolution may include both EPS and external networks 230.

Though described in terms of FIGS. 2-3, the present disclosure is not limited to such an environment. In general, cellular telecommunication systems may be described as cellular networks made up of a number of radio cells, or cells that are each served by a base station or other fixed transceiver. The cells are used to cover different areas in order to provide radio coverage over an area. Example cellular telecommunication systems include Global System for Mobile Communication (GSM) protocols, Universal Mobile Telecommunications System (UMTS), 3GPP Long Term Evolution (LTE), and others. In addition to cellular telecommunication systems, wireless broadband communication systems may also be suitable for the various implementations described in the present disclosure. Example wireless broadband communication system includes IEEE 802.11 wireless local area network, IEEE 802.16 WiMAX network, etc.

Figure 4:
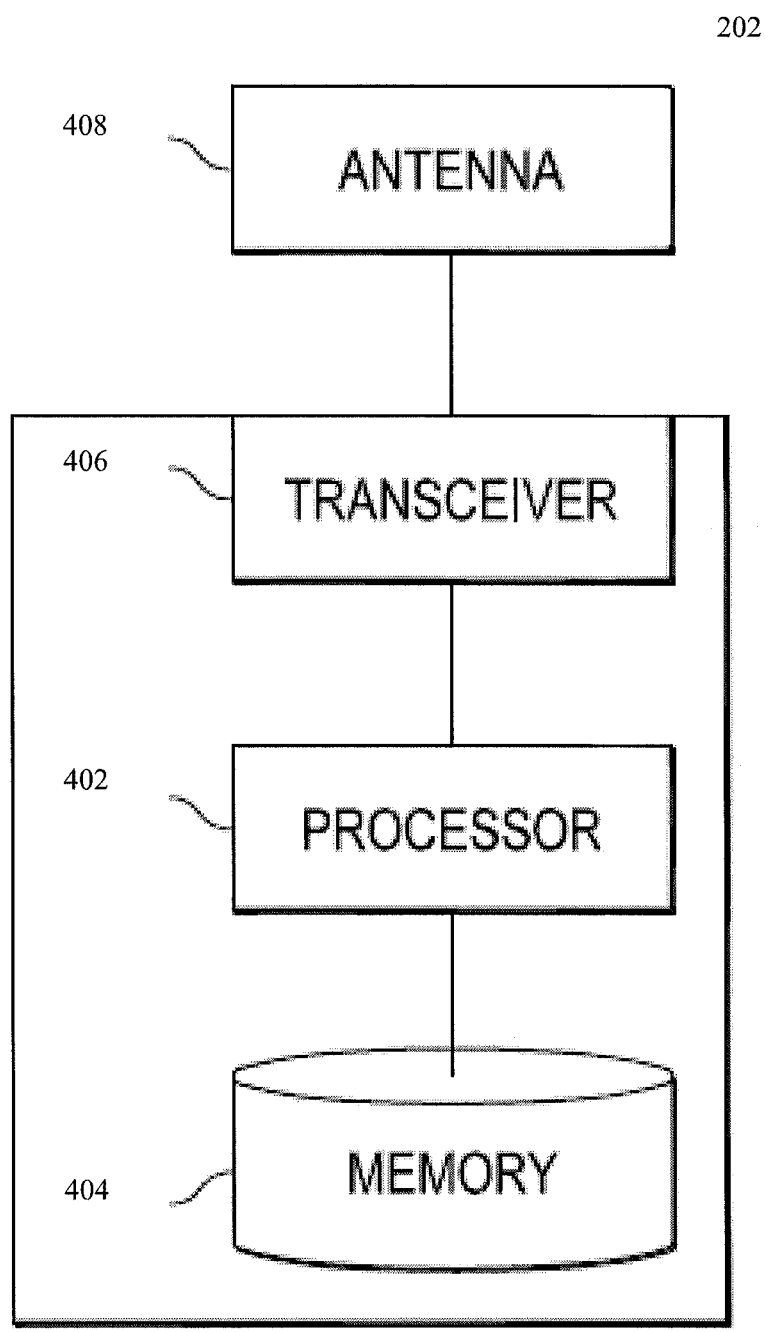
FIG. 4 is a schematic illustration of an example user equipment (UE).

Turning briefly to FIG. 4, each UE 202 may be any electronic device operable to receive and transmit wireless signals in the LTE telecommunication system 200. FIG. 4 is a schematic illustration of an example user equipment (UE) 202. UE 202 may include a processor 402, a memory 404, a wireless transceiver 406, and an antenna 408. The processor 402 may comprise a microprocessor, central processing unit, graphic control unit, network processor, or other processor for carrying out instructions stored in memory 404. The functions of the processor 402 may include computation, queue management, control processing, graphic acceleration, video decoding, and execution of a sequence of stored instructions from the program kept in the memory module 404. In some implementations, the processor 402 may also be responsible for signal processing including sampling, quantizing, encoding/decoding, and/or modulation/demodulation of the signal. The memory module 404 may include a temporary state device (e.g., random-access memory (RAM)) or data storage. The memory module 204 can be used to store data or programs (i.e., sequences of instructions) on a temporary or permanent basis for use in a UE. The wireless transceivers 406 can include both the transmitter circuitry and the receiver circuitry. The wireless transceivers 406 may be responsible for up-converting a baseband signal to a passband signal, or vice versa. The components of wireless transceivers 406 may include a digital-to-analog converter/analog-to-digital converter, amplifier, frequency filter and oscillator. The antenna 408 is a transducer which can transmit and/or receive electromagnetic waves. Antenna 408 can convert electromagnetic radiation into electric current, or vice versa. Antenna 408 is generally responsible for the transmission and reception of radio waves, and can serve as the interface between the transceiver 406 and the wireless channel.

The LTE network environment and UE described above in relation to FIGS. 2-4 may function to dynamically identify or update TDD configuration information. In an embodiment, a method for configuring a Time Division Duplex (TDD) UL/DL allocation in a UE in an LTE network can include receiving, at a predefined period, during a connected state, each information block transmitted by an enhanced NodeB (eNB) in the LTE network, wherein each information block is transmitted in accordance with a fixed schedule having a predefined transmission period and includes information identifying a TDD configuration. The UE may determine that an updating of the TDD configuration is requested or required based, at least in part, on the information identifying the TDD configuration in the information block, the information identifying the TDD configuration indicating an updated TDD configuration. In response to at least identifying the updated TDD configuration, the UE can automatically update the TDD UL/DL allocation of the UE in accordance with the updated TDD configuration.

The information block transmitted may be in a System Information Block Type 1 (SIB1) or a MasterInformationBlock (MIB). The MIB uses a fixed schedule with a periodicity of 40 ms and repetitions made within 40 ms. The first transmission of the MIB is scheduled in subframe 0 of radio frames for which the System Frame Number (SFN) mod 4=0, and repetitions are scheduled in subframe 0 of all other radio frames. The new TDD-Config information can be applied as quickly as at the beginning of the next 40 ms MIB period. In certain example implementations, there may be ten "spare" bits in the MIB. An example MIB structure without the TDD-Config bits is provided below:

```
-- ASN1START
MasterInformationBlock ::=    SEQUENCE {
    dl-Bandwidth              ENUMERATED {
                                 n6, n15, n25, n50, n75, n100},
    phich-Config              PHICH-Config,
    systemFrameNumber         BIT STRING (SIZE (8)),
    spare                     BIT STRING (SIZE (10))
}
-- ASN1STOP
```

In certain embodiments, the MIB may be updated to include the TDD configuration. Three bits may be used from the "spare" bits to represent seven TDD configurations. An example MIB structure that includes the TDD configuration bits is shown below:

```
-- ASN1START
MasterInformationBlock ::=    SEQUENCE {
    dl-Bandwidth              ENUMERATED {
                                 n6, n15, n25, n50, n75, n100},
    phich-Config              PHICH-Config,
    systemFrameNumber         BIT STRING (SIZE (8)),
    tdd-Config                BIT STRING (SIZE (3)),
                              OPTIONAL,-- Cond TDD
    spare                     BIT STRING (SIZE (7))
}
-- ASN1STOP
```

In certain embodiments, two bits may be used to indicate a change of TDD configurations by limiting the choices of such change (i.e., tdd-Config BIT STRING (SIZE (2)). For example, if the new TDD configuration has the same switching periodicity as the current TDD configuration, then the total number of configurations can be divided into two groups, and within each group there are at most four configurations (see Table 2 for details). Thus, two bits are enough to indicate a change in TDD configurations. Similarly, one bit can be used to indicate a move from one configuration to another, adjacent configuration. For example, if the existing configuration is configuration "1," one bit is sufficient to indicate a move down to configuration "2" or a move up to configuration "6," based on the organization of the TDD configurations shown in Table 2 below. Generally, the term "TDD configuration change" can include an indication of a new TDD configuration or an indication in whether/how to change the TDD configuration.

When the MIB message is used to identify a TDD configuration, new release UEs receive and understand it and change the configuration accordingly at next frame. New release UEs may operate in accordance with this disclosure, and legacy UEs may operate in accordance with Release 10 and earlier. Legacy UEs might not attempt to decode the last 10 bits of the bit string, so legacy UEs may keep the same configuration as before. It is possible that when the TDD configuration is changed, the system also updates the TDD configuration information in SIB1 based on a modification period. The system can then trigger a system information modification notification procedure. Therefore, the legacy UEs will eventually update the configuration in the next modification period. If there are multiple configuration changes during the (minimum) 640 ms modification period, the most recent change will be applied. As a result, the legacy UEs will also change the TDD configuration to an updated configuration If the configuration change is very frequent, it is not always necessary to make the legacy UE to follow up with the change via SIB1 information change. The system can keep tracking the configuration change rate (CCR) for every given period, e.g., 640 ms. If the CCR is less than a certain pre-defined threshold, $T_{CCR}$, the system may update the TDD configuration information in SIB1, and the system information modification notification procedure will follow. Otherwise, the system does not update the SIB1. In this example implementation, the system can save system radio resource and batter power for legacy UEs. Interference issues between new and legacy ("inter-release") UEs (especially where the inter-release UEs are located very close to each other) may occur during the time duration of subframes which are switched from UL to DL. The UL/DL configurations can be divided into two groups in terms of the switching point periodicity in ascending order based on the number of DL subframes: one group with the periodicity of 5 ms (configurations 0, 1, 2, 6 of Table 2), and one group with the periodicity of 10 ms (configurations 3, 4, 5 of Table 1). Table 2 shows how the seven configurations can be grouped.

TABLE 2

| | UL/DL configuration groups | | | | | | | | | | |
|---|---|---|---|---|---|---|---|---|---|---|---|
| Uplink-downlink configuration | Downlink-to-Uplink Switch-point periodicity | \multicolumn{10}{c}{Subframe number} |
| | | 0 | 1 | 2 | 3 | 4 | 5 | 6 | 7 | 8 | 9 |
| Group One | | | | | | | | | | | |
| 0 | 5 ms | D | S | U | U | U | D | S | U | U | U |
| 6 | 5 ms | D | S | U | U | U | D | S | U | U | D |
| 1 | 5 ms | D | S | U | U | D | D | S | U | U | D |
| 2 | 5 ms | D | S | U | D | D | D | S | U | D | D |

TABLE 2-continued

UL/DL configuration groups

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| Group Two | | | | | | | | | | | |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |

The candidate configurations are limited to the same group of the current configuration of the UE. In this way, the number of subframes with a link direction change will be relatively small. Moreover, the eNB may not grant any UL transmissions for legacy UEs at link-direction-conflict subframes in subsequent frames. For example, if the current configuration is 0 and the system decides to change to configuration 6, the eNB should deny any UL grant at subframe 9 in subsequent frames. For UL control signal transmission and non-adaptive retransmission, they will be transmitted without UL grant.

For TDD LTE systems, Sounding Reference Signal (SRS) is transmitted at one or both symbols in UpPTS, which is not changed as the configuration change. The eNB knows where to detect sounding reference signals.

Physical Uplink Control Channel (PUCCH) transmission: Given the fact that there is no data transmission (UL grant denied) and re-transmission (see below regarding hybrid automatic repeat request (HARM) retransmission handling), the Physical Uplink Control Channel (PUCCH) only transmission of legacy UEs will be placed at the frequency edges of the bandwidth. Moreover, periodic channel state parameters for legacy UEs, including channel quality indicators, precoding matrix indeces, and/or rank indicators, can also be scheduled in the UL subframe that does not change within a configuration group. Only those subframes with link direction change at these frequency edges will cause an interference issue. The number of trouble subframes is very limited, so the eNB should be able to avoid scheduling nearby new release UEs at this frequency edges for the time of subframe with link direction change.

HARQ retransmission handling: The eNB may check if there is/will be a retransmission at the time of link direction change subframes before sending out the configuration change indicator. If so, it should defer the configuration change.

SPS scheduling: In the case of UL transmission at the direction conflict subframe due to SPS scheduling, eNB can do one of the following: reconfigure the SPS by sending an sps-Config message (existing IE RadioResourceConfigDedicated); or defer the configuration change as the same used in the HARQ handling.

DRX: For MIB and SIB1-based techniques, it requires the UE to read configuration information from MIB or SIB1 upon every wakeup so the UE knows the current configuration. MIB is transmitted on a physical channel, specifically, the physical broadcast channel (PBCH). The way it is designed such that every transmission is self-decodable. Most likely, UE will likely detect the MIB on the first subframe 0 transmission. SIB1 is always scheduled on subframe 5, and it is also self-decodable on each transmission. If the first subframe is not subframe 0 (when using MIB for TDD configuration) or subframe 5 (when using SIB1 for TDD configuration), when UE wakes up, or if the UE is not able to successfully detect the current configuration on first transmission, a predefined configuration can be assumed. For example, configuration 2 (for 5 ms periodicity group) or configuration 5 (for 10 ms periodicity group) should be temporarily assumed until the current configuration is detected. The reason is that configuration 2 and 5 have the fewest UL subframes and will not cause interference to other UEs due to the direction conflict.

After transitioning from a Discontinuous Reception (DRX) mode or an idle mode to a connected mode, a UE may have a delay to receive the system information block identifying the TDD configuration. The UE can automatically update the TDD UL/DL allocation to a predefined TDD configuration in response to the delay. The UE can update the TDD UL/DL allocation to the defined TDD configuration as soon as the UE receives system information block.

Paging and the Physical Random Access Channel (PRACH) are unaffected by using MIB for transmitting TDD configurations. For paging, the LTE TDD uses subframe 0, 1, 5, and 6 for paging. These subframes are always for DL regardless of the configuration. For PRACH, the LTE TDD introduces Short RACH known as format 4. It is always transmitted on the UpPTS, which is in the special subframe and will not change direction as the configuration changes.

In some embodiments, when the configuration changes, the system will page the connected UEs for a system information change notification. The connected UEs reads the new configuration. Idle UEs will not try to receive the system information each modification period. Therefore, the idle UEs' battery efficiency may not be impacted. However, this scheme requires the network to differentiate the paging to connected and idle UEs. It will lead to a more complex paging mechanism. A new Paging RNTI (P-RNTI) may be introduced for this purpose.

In some embodiments, the connected UE can read MIB every 40 ms. Doing so comes at the expense of extra power consumption. It may be understood that the UE power consumption is mainly on the RF transceiver chain, the baseband processing consumes just a small portion of the total power. The power consumption increase should not be significant for this process.

Figure 5A:
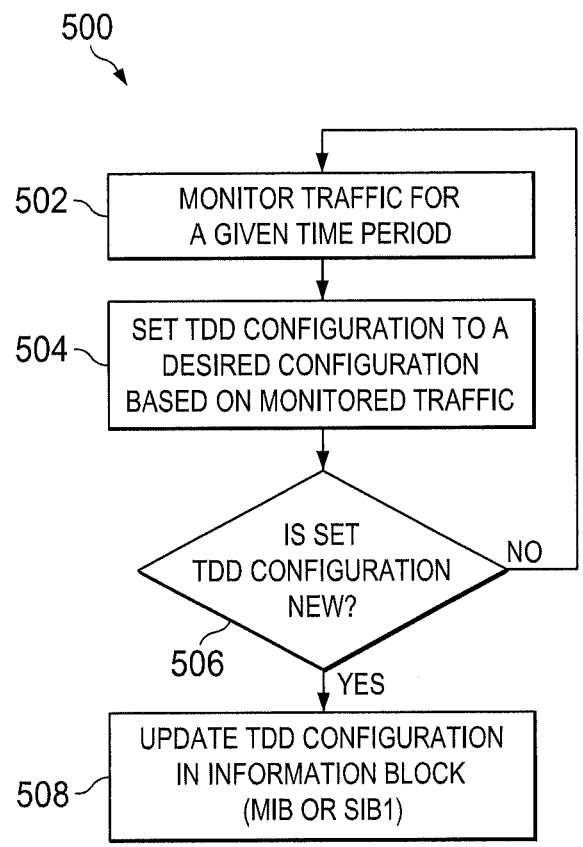
FIG. 5A is an example process flowchart for MasterInformationBlock (MIB) message-based TDD configuration for the enhanced Node-B (eNB).

FIG. 5A is an example process flowchart for MasterInformationBlock (MIB) message-based TDD configuration for the enhanced Node-B (eNB). For a given period (e.g., 40 ms for MIB, 80 ms for SIB1), the traffic period may be monitored 502. The TDD Configuration may be identified and set based on the monitored traffic 504. A determination may be made as to whether the identified TDD configuration information from the monitored traffic is different from the existing TDD configuration used by UEs in communication with the eNB 506. If the identified TDD configuration is different, the TDD configuration can be communicated to the UEs using the MIB or SIB1. Specifically, a TDD-Config field of the MIB or SIB1 can be updated with the new TDD configuration information 508. If the TDD configuration information is not new or different, the traffic can return to 502 to continue to be monitored and TDD configuration information can be identified without updating the MIB or SIB1 TDD-Config field until a different TDD configuration is identified.

Figure 5B:
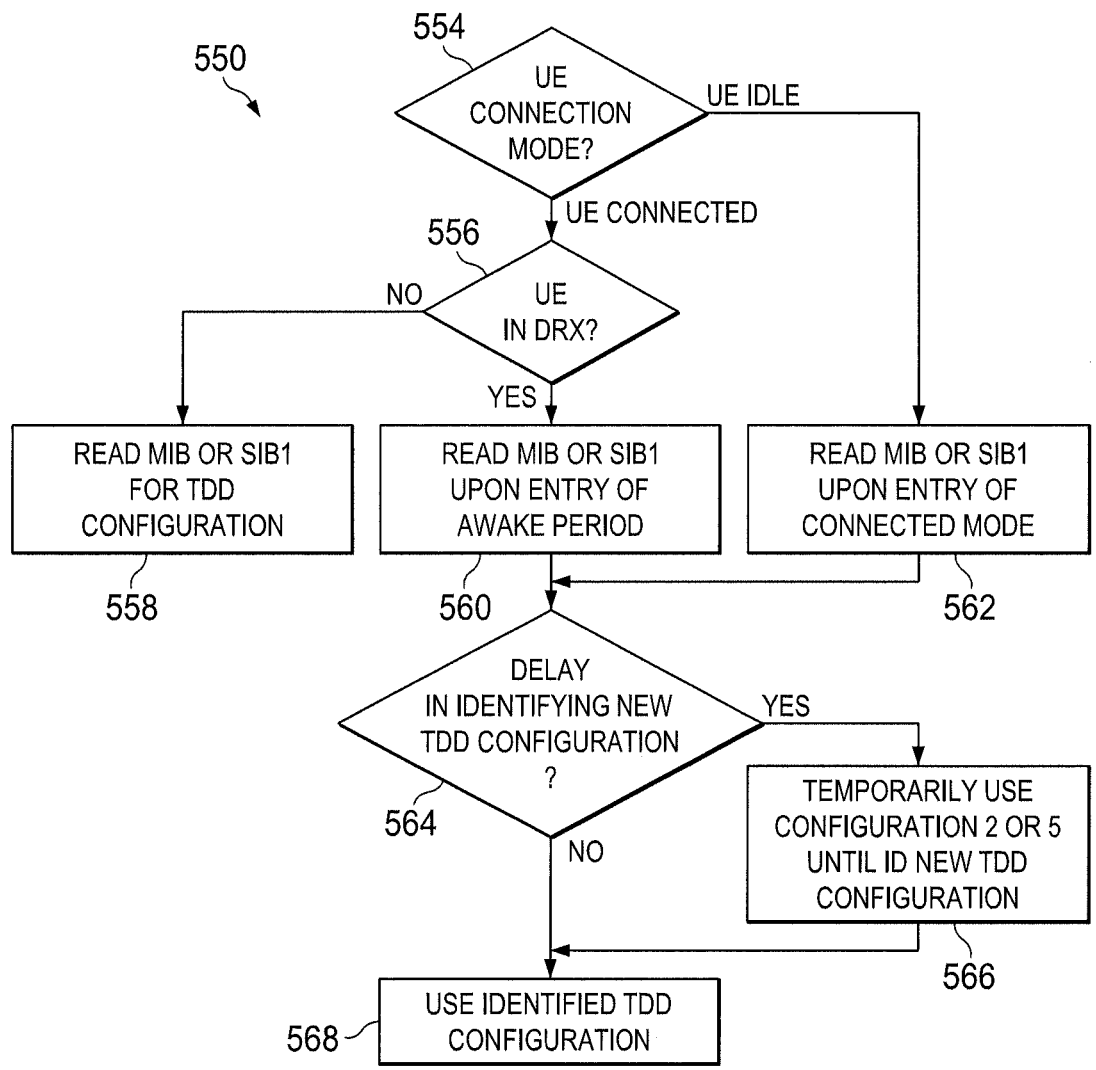
FIG. 5B is an example process flowchart for MIB message-based TDD configuration for the user equipment.

FIG. 5B is an example process flowchart 550 for MIB or SIB1 message-based TDD configuration for the user equipment. A determination may be made as to the UE's connection mode 554. For UEs that are not idle (i.e., connected UEs), a determination is made whether the UE is in DRX mode 556. For UEs not in DRX mode, the UEs may be able to pick up new configuration from MIB or SIB1 558. For UEs in DRX, the UE updates the new configuration using the MIB or SIB1 when it wakes up or enters an awake period (or a period within the awake period) 560. For UEs in idle state, they will update the configuration based on the MIB or SIB1 whenever they become connected or enter a connected mode 562. For UEs in DRX or for idle UEs, if there is a delay in identifying a new TDD configuration 564 (e.g., the first subframe does not contain MIB or SIB1 when UE wakes up, or if the UE is not able to successfully detect the current configuration on first transmission (e.g., because of interference)), configuration 2 (for 5 ms periodicity group) or 5 (for 10 ms periodicity group) may be temporarily assumed until the current configuration is detected 566. This temporary period may be brief since the MIB retransmission is every frame and SIB1 retransmission is every other frame. If there is no delay, or after the expiration of the delay, the identified TDD configuration can be used 568.

Note that the given period in FIGS. 5A-B is normally set as 40 ms or 80 ms, but the period may be a configurable parameter for embodiments where the UE reads MIB less frequently (e.g. every 120 ms, or 160 ms).

Figure 6:
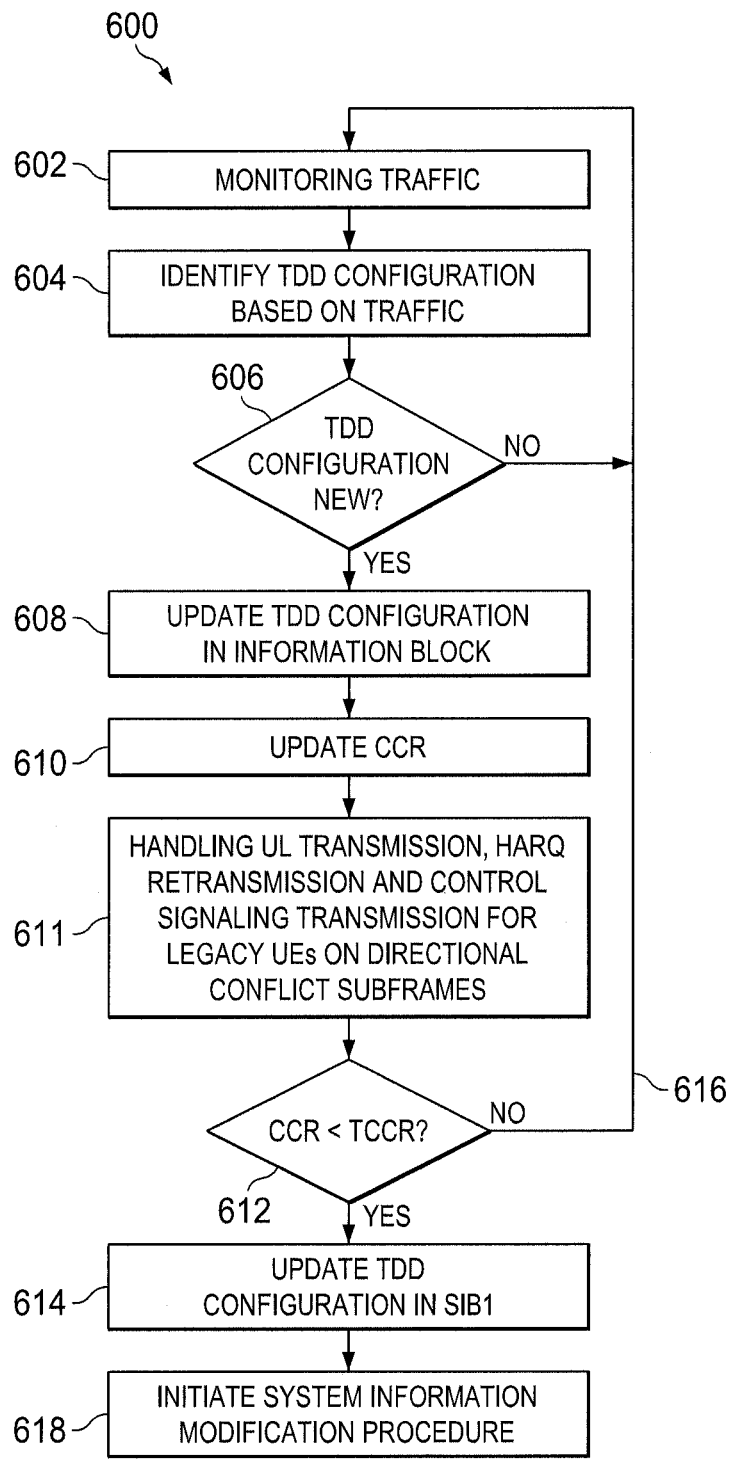
FIG. 6 is an example process flowchart for a mixed new release UE and legacy UE scenario.

FIG. 6 is an example process flowchart 600 for a mixed new release UE and legacy UE scenario. For a given time period (e.g., 40 ms for MIB, 80 ms for SIB1), the traffic is monitored 602. A TDD configuration can be identified based on the traffic 604. A determination may be made as to whether the identified TDD configuration is different from the TDD configuration used at that time by the UEs 606. If the identified TDD configuration is different from the TDD configuration used at the time by the UEs, the information block can be updated with the new TDD configuration 608. The MIB can be updated at the start of the next 40 ms period; the SIB1 can be updated at the start of the next 80 ms period. For example, the TDD-Config field of the MIB can be updated with bits representing the new TDD configuration or a change in the TDD configuration. The configuration change rate (CCR) can be updated 610. In certain implementations, the system can initiate handling UL transmissions, HARQ Retransmission, and Control Signaling Transmission for legacy UEs on directional conflict subframes 611.

The system can keep tracking the CCR for every given period. The CCR can be compared to the $T_{CCR}$ 612. If the CCR is less than certain pre-defined threshold, $T_{CCR}$, the system may update the TDD configuration information in SIB1 614, and the system information modification notification procedure can follow 618. If the CCR is greater than $T_{CCR}$, 616, the system can continue monitoring traffic 602 without updating the TDD configuration for Legacy UEs.

In certain embodiments, the SIB1 may be used for TDD configuration. SIB1 uses a fixed schedule with a periodicity of 80 ms and repetitions made within 80 ms. The first transmission is scheduled in subframe 5 of radio frames for which the SFN mod 8=0, and repetitions are scheduled in subframe 5 of all other radio frames for which SFN mod 2=0. The new TDD configuration information can be applied as quickly as at the beginning of the next 80 ms SIB1 period. The SIB1 technique is similar to the MIB-based technique. Using SIB1 provides a lower maximum configuration change rate.

In some embodiments, a method for configuring a Time Division Duplex (TDD) UL/DL allocation of a user equipment (UE) in a Long Term Evolution (LTE) network includes receiving an indicator, from an eNB in the LTE network, on a physical channel identifying a TDD configuration for the UE. A physical channel is a transmission channel that conveys user data and control messages on the physical layer. The TDD configuration information is embedded or multiplexed onto it. The TDD UL/DL allocation of the UE may be automatically updated in accordance with the TDD configuration.

The Physical Control Format Indicator Channel (PCFICH) is currently used to indicate the number of OFDM symbols used for transmission of PDCCHs in each subframe. It is called Control Format Indicator (CFI). A TDD configuration or configuration change information can be carried over the CFI to be used to update TDD configuration. There are three different CFI code words used in the current version of LTE and a fourth one is reserved for future use as shown in Table 3. Each code word is 32 bits in length.

TABLE 3

| | CFI Code Words |
|---|---|
| CFI | CFI code word <$b_0, b_1, \ldots, b_{31}$> |
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The CFI code word may be scrambled by the TDD configuration or configuration change indicator. In some embodiments, seven configuration indicator values can be used. Each value may correspond to one UL/DL configuration listed in Table 1. As a result, there can be as many as 21 different CFI code words at the end. This may decrease the minimal distance of the code word. At the UE side, after detecting the signal on the PCFICH, UE will descramble the received code word to recover the original CFI value.

In some embodiments, two configuration change indicator values can be used. Each value corresponds to either a move-up or a move-down in the TDD configuration group. The configurations can be divided into two groups in terms of switch periodicity, and organized into ascending order in terms of number of DL subframes, as in Table 2 above. One group is configuration [0, 6, 1, and 2] and the other is [3, 4, and 5]. When a UE detects a move-up indicator, it will change the configuration to one level up to the current level, e.g., from configuration 1 to 6 in group one. If it receives a move-down indicator, it will change to one level down to the current level, e.g. from configuration 6 to 1.

An example of the implementation of two-value configuration change indicator is as follows. We take the first six bits from each CFI code word (1, 2, 3), and perform binary "+1" and "−1" on each of them respectively. Each code word can be extended to 32 bits using the same repetition code as in the current LTE specification. Examples of the resulting nine code words are shown in Table 4.

TABLE 4

| Examples of CFI Code Words for TDD Configuration |
|---|
| CFI1 + 1: [0, 1, 1, 1, 0, 0, 0, 1, 1, 1, 0, 0, 0, 1, 1, 1, 0, 0, 0, 1, 1, 1, 0, 0, 0, 1, 1, 1, 0, 0, 0, 1] |
| CFI1 − 1: [0, 1, 1, 0, 1, 0, 0, 1, 1, 0, 1, 0, 0, 1, 1, 0, 1, 0, 0, 1, 1, 0, 1, 0, 0, 1, 1, 0, 1, 0, 0, 1] |
| CFI2 + 1: [1, 0, 1, 1, 1, 0, 1, 0, 1, 1, 1, 0, 1, 0, 1, 1, 1, 0, 1, 0, 1, 1, 1, 0, 1, 0, 1, 1, 1, 0, 1, 0] |
| CFI2 − 1: [1, 0, 1, 1, 0, 0, 1, 0, 1, 1, 0, 0, 1, 0, 1, 1, 0, 0, 1, 0, 1, 1, 0, 0, 1, 0, 1, 1, 0, 0, 1, 0] |
| CFI3 + 1: [1, 1, 0, 1, 1, 1, 1, 1, 1, 0, 1, 1, 1, 1, 1, 1, 0, 1, 1, 1, 1, 1, 1, 0, 1, 1, 1, 1, 1, 1, 0, 1, 1, 1, 1, 1] |
| CFI3 − 1: [1, 1, 0, 1, 0, 1, 1, 1, 0, 1, 0, 1, 1, 1, 0, 1, 0, 1, 1, 1, 0, 1, 0, 1, 1, 1, 0, 1, 0, 1, 1, 1] |

One CFI value has three code words associated with it. They represent configuration move-up a level, move-down a level, and no change, respectively. Table 5 shows an example of CFI code words.

TABLE 5

Examples of CFI Code Words Corresponding to TDD Configuration Changes

| CFI | CFI code word <$b_0, b_1, \ldots, b_{31}$> | TDD configuration change |
|---|---|---|
| 1 | <0, 1, 1, 1, 0, 0, 0, 1, 1, 1, 0, 0, 0, 1, 1, 1, 0, 0, 0, 1, 1, 1, 0, 0, 0, 1, 1, 1, 0, 0, 0, 1> | Move-up |
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> | Unchanged |
| 1 | <0, 1, 1, 0, 1, 0, 0, 1, 1, 0, 1, 0, 0, 1, 1, 0, 1, 0, 0, 1, 1, 0, 1, 0, 0, 1, 1, 0, 1, 0, 0, 1> | Move-down |
| 2 | <1, 0, 1, 1, 1, 0, 1, 0, 1, 1, 1, 0, 1, 0, 1, 1, 1, 0, 1, 0, 1, 1, 1, 0, 1, 0, 1, 1, 1, 0, 1, 0> | Move-up |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> | Unchanged |
| 2 | <1, 0, 1, 1, 0, 0, 0, 1, 0, 1, 1, 0, 0, 0, 1, 0, 1, 1, 0, 0, 1, 0, 1, 1, 0, 0, 1, 0, 1, 1, 0, 0> | Move-down |
| 3 | <1, 1, 0, 1, 1, 1, 1, 1, 0, 1, 1, 1, 1, 1, 0, 1, 1, 1, 1, 1, 0, 1, 1, 1, 1, 1, 0, 1, 1, 1, 1, 1> | Move-up |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> | Unchanged |
| 3 | <1, 1, 0, 1, 0, 1, 1, 1, 0, 1, 0, 1, 1, 1, 0, 1, 0, 1, 1, 0, 1, 0, 1, 1, 1, 0, 1, 0, 1, 1, 1, 1> | Move-down |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> | |

Figure 7:
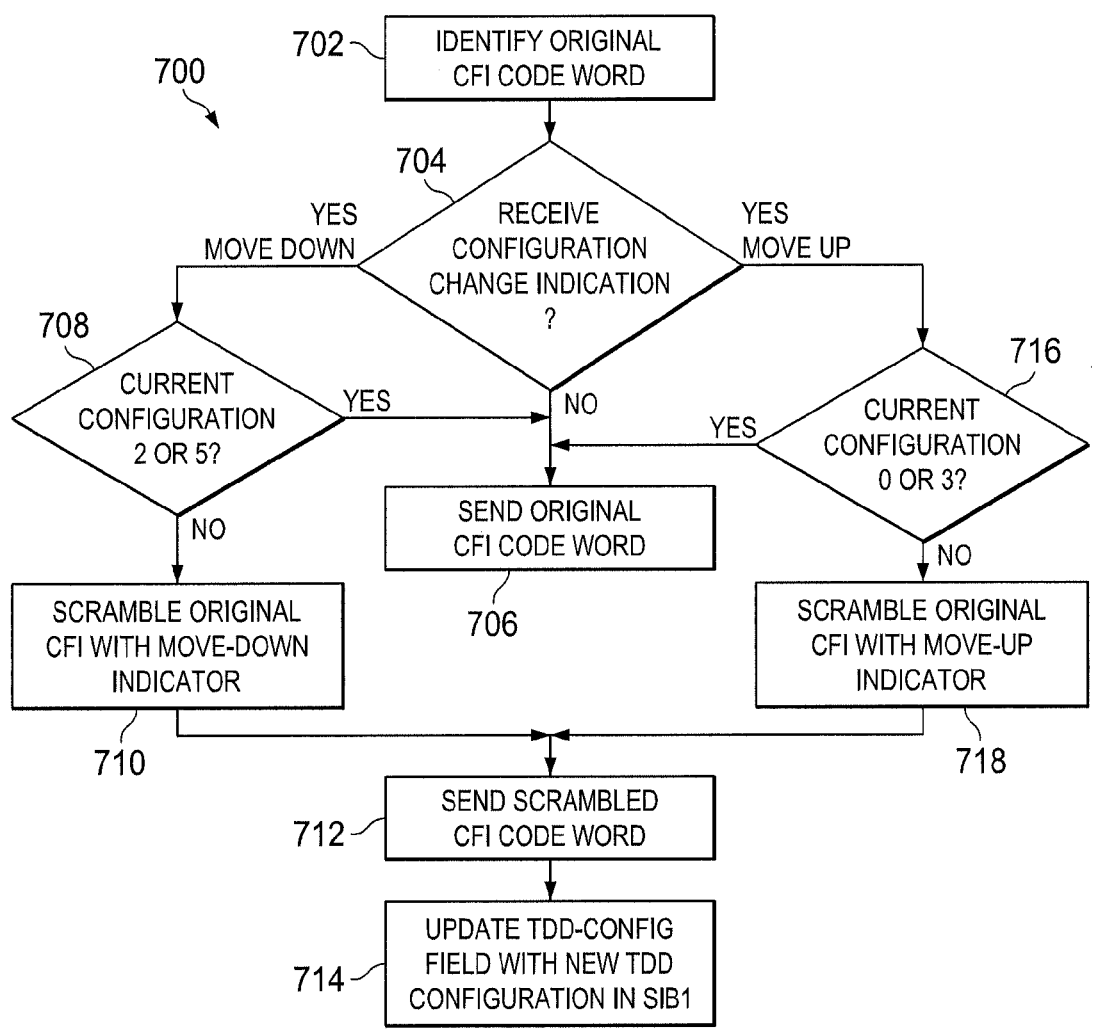
FIG. 7 is an example process flowchart for scrambling one or more Control Format Indicator (CFI) code words with TDD configuration information.

FIG. 7 is an example process flowchart 700 for scrambling one or more CFI code words with TDD configuration information. An original code word can be identified 702. The system may check whether a configuration change indication was received 704. If no configuration change indication was received, the system can transmit the original CFI code word 706. If a "move-down" indication was received 708, a check may be performed as to whether the current TDD configuration is already set to configuration 2 or 5 (of Table 2 above) 708. If a move-down indication was received (i.e., DL heavier), and the TDD configuration is already in configuration 2 or 5, the eNB will not instruct any configuration change to UEs, and the system may transmit the original CFI code word 706. If a configuration change indicator was received, and the configuration is not one of configurations 2 or 5, the identified CFI code word can be scrambled with the move-down indicator 710. The scrambled CFI code word can be transmitted 712, and the TDD-Config field of SIB1 can be updated with the new TDD configuration 714. If the received configuration change indication is a "move-up" indication (i.e., UL heavier), a check may be performed as to whether the configuration is set to configuration 0 or 3 (of Table 2 above) 716. If a configuration change indicator was received, and the TDD configuration is set to configuration 0 or 3, the eNB will not instruct any configuration change to UEs, and the original CFI code word can be transmitted 706. If a configuration change indicator was received, and the TDD configuration is not in one of configurations 0 or 3, the identified CFI code word can be scrambled with the move-up indicator 718. The scrambled CFI code word can be transmitted 712, and the SIB1 can be updated with the new TDD configuration information 714.

There are various embodiments for the move-up and move-down indicators. An error-correcting coding scheme can be also used instead of the current repetition code to increase the reliability of CFI code word transmission. Moreover, if there is error in detection, the UE will have an opportunity to correct it from the regular system information change notification procedure via updated SIB1. Thus, the risk of propagating the error can be diminished.

Figures 8A, 8B:
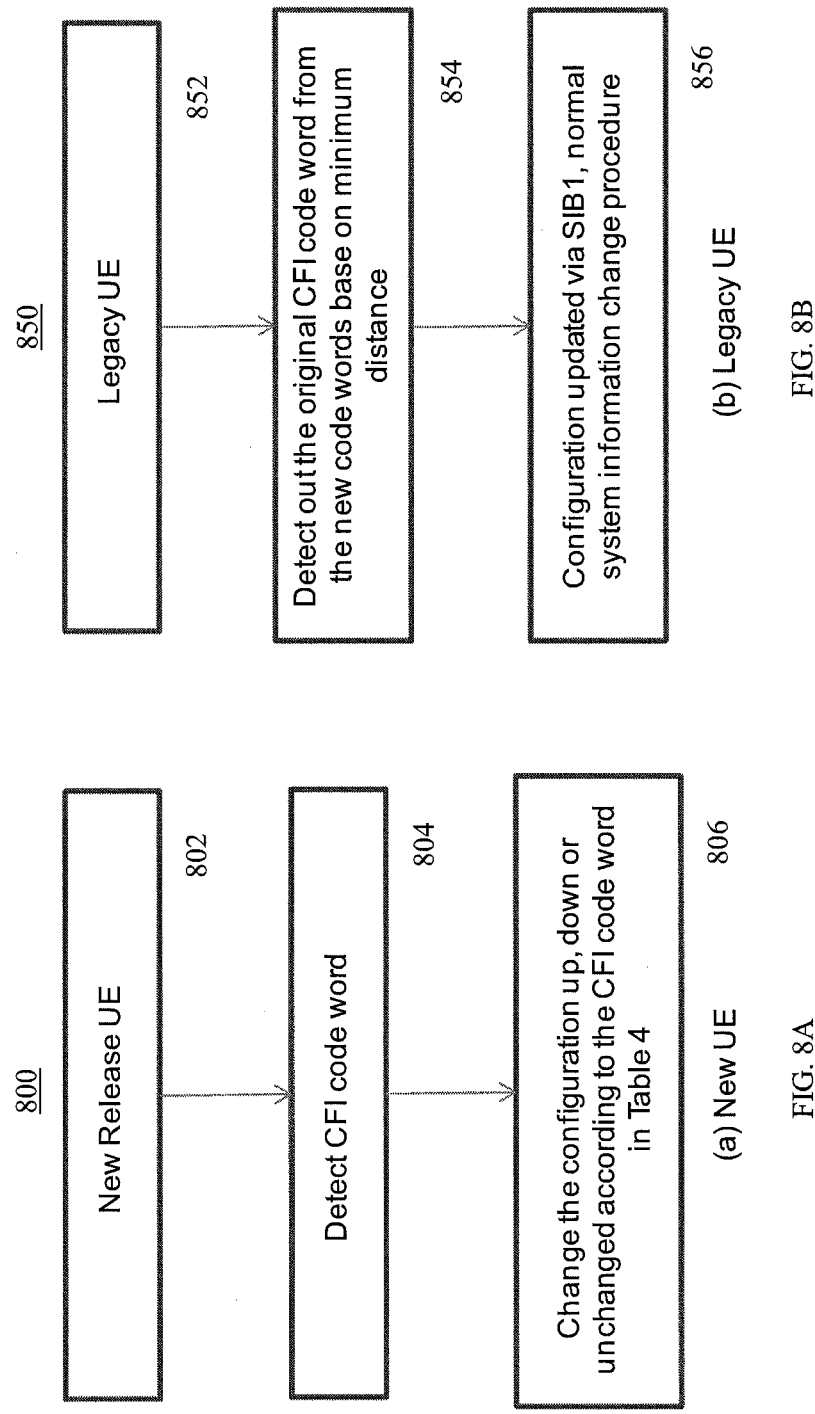
FIG. 8A is an example process flowchart for new release user equipment for Physical Control Format Indicator Channel (PCFICH)-based TDD configuration.
FIG. 8B is an example process flowchart for legacy UEs for PCFICH-based TDD configuration.

FIG. 8A is an example process flowchart 800 for new release UEs for PCFICH-based TDD configuration. At the UE, for new release UEs 802, after detecting the CFI code word 804, UE may adjust the configuration accordingly 806. FIG. 8B is an example process flowchart 850 for legacy UEs for PCFICH-based TDD configuration. For legacy UEs 852, the original CFI code word will be detected based on minimum distance as shown in Table 5 854. The TDD configuration can be updated via normal system information change procedure 856.

The LTE TDD system may change the TDD configuration at the frequency of every frame. The eNB may use the same configuration change indicator in the duration of each frame to scramble the CFI value. The UE will detect the same configuration change indicator during the frame. Doing so may increase the robustness of detection.

In some embodiments, the TDD configuration is changed every DL subframe. The eNB may use an independent configuration change indicator in every subframe to scramble the CFI value. This scheme requires careful coordination of other system processes, such as HARQ, interference, etc.

The PCFICH-based TDD configuration also allows legacy UEs operating as normal because the PCFICH detection is minimum distance based. Although the legacy UE is not able to recognize the new CFI code word in Table 5, it will be able to detect the original CFI code word from the new CFI code words based on the minimum distance. Therefore, it will continue to operate as normal. The side issues of UL transmission, HARQ retransmission and control signalling transmission for legacy UEs, etc., may operate in a similar manner as described above for MIB-based TDD configuration.

In certain embodiments, the PDCCH may be used for TDD configuration. The PDCCH channel carries a Downlink Control Information (DCI). It supports multiple formats and the UE needs to search and blindly detect the format of the PDCCHs. Search spaces have been defined in the LTE specification. It describes the set of CCEs the UE is required to monitor. There are two types of search spaces: common search space and UE-specific search space. The common search space carries the common control information and is monitored by all UEs in a cell. A new DCI format, called Format TDDConfig, may be transmitted on the common search space. A new Radio Network Temporary Identifier called TDD-RNTI, is used to scramble the CRC of Format TDDConfig. TDD-RNTI can be defined. For example, we can define TDD-RNTI value as shown in Table 6 based on availability.

TABLE 6

TDD-RNTI

| Value (hexa-decimal) | RNTI |
|---|---|
| FFFC | TDD-RNTI |

For seven TDD configurations (e.g., those defined above in Table 1), three bits is sufficient to represent all the configurations. In certain embodiments, the three bits will be appended by sixteen-bit scrambled CRC. To increase the robustness of error protection, one can encode the three bits with a simple forward error correction (FEC) code, such as repetition code or Bose and Ray-Chaudhri (BCH) code, etc. The code word after encoder will be the payload of DCI format TDD-Config. As an example, to make the size comparable to other DCI format (payload size is different with respect to the number of antenna and the bandwidth) on the common search space, Table 7 shows the payload of DCI format TDDConfig by using nine-time repetition code, which is twenty-seven bits. Then the 27-bit code word will be appended by the scrambled CRC.

TABLE 7

DCI Format TDDConfig

| Field | Bits |
|---|---|
| TDD Configuration Indicator | 27 (3 bits repeated 9 times) |

The scrambled CRC is obtained by performing a bit-wise exclusive or (XOR) operation between the 16-bit CRC and the 16-bit TDD-RNTI (FFFC). Therefore, the total number of bits for DCI Format TDDConfig is forty-three. Given the fact that the PDCCH on the common search space is at least at aggregation level four, after channel coding, the final code rate will be very low. This will provide an excellent possibility of correct detection. For PDCCH-based TDD configuration, the information UE receives can be a configuration indicator which directly represents the configuration. This will provide more flexibility on configuration choice. It can also be the configuration change indicator which only needs one bit to represent it.

Figure 9:
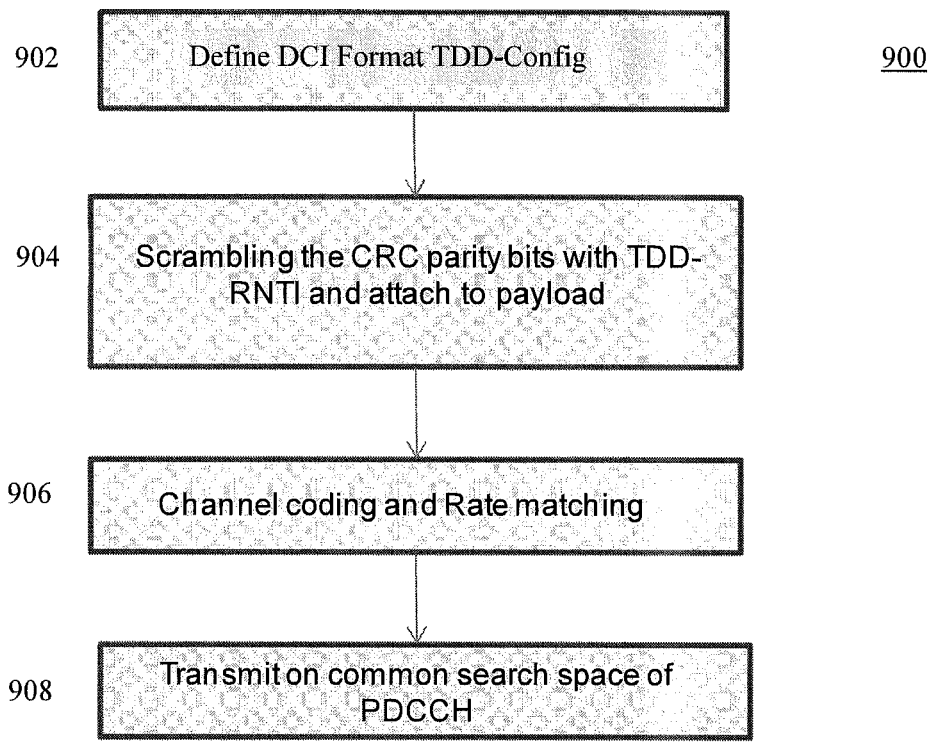
FIG. 9 is an example enhanced Node B process flowchart for Physical Downlink Control Channel (PDCCH)-based TDD configuration.
Figure 10:
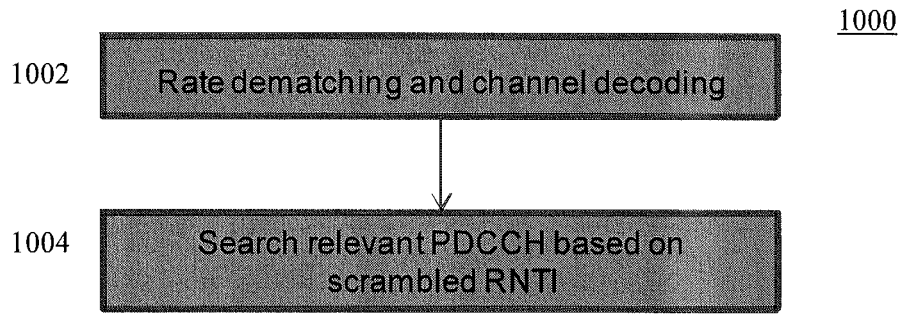
FIG. 10 is an example UE process flowchart for PDCCH-based TDD configuration.

FIGS. 9 and 10 show the implementation of proposed PDCCH-based technique at the eNB and UE. FIG. 9 is an example enhanced Node B process flowchart 900 for PDCCH-based TDD configuration. A DCI format TDD-Config can be defined 902. The CRC bits may be scrambled using the TDD-RNTI and attached to a payload 904. Then, a tail-biting convolutional coding may be performed. The coded stream is rate-matched to a predefined the rate via puncturing or padding some bits. The channel can be coded, and a rate matching procedure can be implemented 906. The payload along with the scrambled CRC bits are transmitted on a common search space of the PDCCH 908.

FIG. 10 is an example UE process flowchart 1000 for PDCCH-based TDD configuration. The UE may receive a payload. The channel may be decoded following a rate matching procedure 1002. The PDCCH may be searched based on the scrambled TDD-RNTI 1004.

For PDCCH and PCFICH-based techniques, the TDD configuration detection delay issue is alleviated since the configuration information is embedded in every DL subframe.

New release TDD UEs can search for the DCI Format TDD-Config and detect the TDD configuration in addition to the existing search rules. If there are no legacy UEs in the network, all served UEs will change to the new configuration at the same time. For legacy UEs, however, the UEs follow the existing search rules and do not have ability to detect the new TDD configuration. As mentioned in the previously, the legacy UE will update the TDD configuration using the standard system information change procedure through SIB1. If there are legacy UEs in the network, inter-release UE interference can be addressed in a similar fashion as described above.

The TDD configuration change can be at the frequency of every frame. For example, the eNB can use the same TDD configuration in DCI Format TDDConfig in the duration of each frame. The UE can detect the same configuration or configuration change indicator at each subframe during the frame, which can increase the robustness of detection. In certain embodiments, the eNB can use the same TDD configuration in DCI Format TDD-Config in the duration of each frame; however, it may not be transmitted on each DL or special subframe, it may only be transmitted in a few DL or special frames e.g., only in subframe 0, or only on two special frames, etc. Doing so may alleviate the load of PDCCH. In some implementations, the TDD configuration indicator can be sent every DL subframe. For example, the eNB can use different TDD configuration in DCI Format TDD-Config in the duration of each subframe. This scheme requires careful coordination of other system processes, such as HARQ, interference, etc.

The TDD-Config information element (IE) is in SIB1 and RadioResourceConfigCommon IE. As mentioned above, the UE may only read SIB1 once every 640 ms due to the accommodation of DRX of idle UEs. The increase of SIB1 reading frequency will represent the UE power consumption increase. This increase is significant since it involves the RF transceiver chain. Therefore, a possible message-based TDD configuration indication may use an RRC connection reconfiguration procedure. If a TDD reconfiguration is needed, the TDD-Config IE can be changed to represent a desired configuration. The RRC connection reconfiguration procedure can be initiated, including the mobilityControlInfo (it contains RadioResourceConfigCommon IE, which has the new TDD-Config) to UEs in RRC_Connected state. The SIB1 may be updated with the new configuration. It is to be understood that the RRC message is an example. A new procedure may be defined, e.g., TDD reconfiguration procedure, and introduce a new message. Idle UEs may obtain the current configuration when it becomes connected via SIB1.

Using a dedicated signal for TDD configuration is backwards compatible between new release UEs and legacy UEs. In certain embodiments, a new procedure may be introduced (e.g., the TDD reconfiguration procedure), which sends a message only to communicate the TDD-Config IE to the connected UE.

Using a dedicated signal can be used as a supplementary TDD configuration technique in addition to other techniques described herein for dealing with the legacy UE configuration change. In this way, the legacy UE does not have to wait for modification period of 640 ms. It can change the configuration within 20 ms.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for configuring a Time Division Duplex (TDD) Uplink/Downlink (UL/DL) allocation in a user equipment (UE) in a Long Term Evolution (LTE) network, comprising:
   receiving, at a predefined period, during a connected state, each information block transmitted by an enhanced NodeB in the LTE network, wherein each information block is transmitted in accordance with a fixed schedule having a predefined transmission period and includes information identifying a TDD configuration, wherein each information block comprises a Master Information Block (MIB) and wherein the TDD configuration is transmitted using three bits or less;
   determining that an updating of the TDD configuration is required for the UE based, at least in part, on the information identifying the TDD configuration in the information block, the information identifying the TDD configuration indicating an updated TDD configuration; and
   in response to at least identifying the updated TDD configuration, automatically updating the TDD UL/DL allocation of the UE in accordance with the updated TDD configuration.

2. The method of claim 1, wherein the predefined reception period is 40 milliseconds (ms) or 80 ms.

3. The method of claim 1, further comprising:
   after transitioning from a Discontinuous Reception (DRX) mode or an idle mode to a connected state, determining a delay in receiving the information block identifying the TDD configuration; and
   automatically updating the TDD UL/DL allocation to a predefined TDD configuration in response to at least determining the delay.

4. The method of claim 3, wherein the UE updates the TDD UL/DL allocation to the predefined TDD configuration as soon as the UE receives information block.

5. The method of claim 3, wherein the predefined TDD configuration is UL/DL configuration 5.

6. The method of claim 3, wherein the predefined TDD configuration is UL/DL configuration 2.

7. A user equipment (UE) comprising:
   one or more hardware processors for configuring a Time Division Duplex (TDD) Uplink/Downlink (UL/DL) allocation in the UE, the one or more hardware processors configured to:
   receive, at a predefined period, during a connected state, each information block transmitted by an enhanced NodeB in a Long Term Evolution the (LTE) network, wherein each information block is transmitted in accordance with a fixed schedule having a predefined transmission period and includes information identifying a TDD configuration, wherein each information block comprises a Master Information Block (MIB) and wherein the TDD configuration is transmitted using three bits or less;
   determining that an updating of the TDD configuration is required for the UE based, at least in part, on the information identifying the TDD configuration in the information block, the information identifying the TDD configuration indicating an updated TDD configuration; and
   in response to at least identifying the updated TDD configuration, automatically updating the TDD UL/DL allocation of the UE in accordance with the updated TDD configuration.

8. The user equipment of claim 7, wherein the predefined reception period is 40 milliseconds (ms) or 80 ms.

9. The user equipment of claim 7, wherein the one or more hardware processors are further configured to determine a delay in receiving the system information block identifying the TDD configuration after transitioning from a Discontinuous Reception (DRX) mode or an idle mode to a connected state, and automatically update the TDD UL/DL allocation to a predefined TDD configuration in response to at least detecting the delay.

10. The user equipment of claim 9, wherein the UE updates the TDD UL/DL allocation to the predefined TDD configuration as soon as the UE receives system information block.

11. The user equipment of claim 9, wherein the predefined TDD configuration is UL/DL configuration 5.

12. The user equipment of claim 9, wherein the predefined TDD configuration is UL/DL configuration 2.

13. A method for configuring a Time Division Duplex (TDD) mode in a Long Term Evolution (LTE) network, comprising:
   monitoring traffic in an LTE network during a plurality of different time periods, each time period of the plurality of different time periods substantially equal to a predefined period based, at least in part, on traffic characteristics;
   for each time period, setting a TDD configuration based, at least in part, on the monitored traffic; and
   periodically transmitting information blocks to user equipment in the LTE network, the information blocks including information identifying the TDD configuration;
   wherein each information block comprises a Master Information Block (MIB) and wherein the TDD configuration is transmitted using three bits or less.

14. The method of claim 13, wherein the predefined UE reception period is 40 milliseconds (ms) or 80 ms.

15. The method of claim 13, further comprising:
   determining a configuration change rate (CCR) for each of the plurality of different time periods;
   determining whether the CCR for each of the plurality of different time periods is less than a predefine threshold; and
   updating, for an associated time period, the TDD configuration in the SIB1 in response to the CCR being less than the threshold.

16. An apparatus for configuring a Time Division Duplex (TDD) mode in a Long Term Evolution (LTE) network, the apparatus comprising one or more hardware processors configured to:
   monitor traffic in an LTE network during a plurality of different time periods, each time period of the plurality of different time periods substantially equal to a predefined period based, at least in part, on traffic characteristics;
   for each time period, set a TDD configuration based, at least in part, on the monitored traffic;

periodically transmit information blocks to user equipment in the LTE network, the information blocks including information identifying the TDD configuration, wherein each information block comprises a Master Information Block (MIB) and wherein the TDD configuration is transmitted using three bits or less.

17. The apparatus of claim 16, wherein the predefined UE reception period is 40 milliseconds (ms) or 80 ms.

18. The apparatus of claim 16, wherein the one or more hardware processors are further configured to:
   determine a configuration change rate (CCR) for each of the plurality of different time periods;
   determine whether the CCR for each of the plurality of different time periods is less than a predefine threshold; and
   update, for an associated time period, the TDD configuration in the SIB1 in response to the CCR being less than the threshold.

19. A method for configuring a Time Division Duplex (TDD) mode of a connected user equipment (UE) in a Long Term Evolution (LTE) network, comprising:
   receiving a dedicated signaling message exclusively dedicated for TDD configuration information, the TDD configuration information identifying resource allocation between uplink (UL) and downlink (DL), wherein the dedicated signaling message is received within a time window less than 640 milliseconds after a prior message indicating TDD configuration information; and
   automatically updating the TDD mode of the UE in accordance with the UL/DL resource allocation identified by the TDD configuration information in the dedicated signaling message.

20. The method of claim 19, wherein the dedicated signaling message is a radio resource control (RRC) connection reconfiguration message.

21. The method of claim 20, wherein the radio resource control connection reconfiguration message includes a radio resource configuration common information element.

22. The method of claim 21, wherein the radio resource configuration common information element includes a new TDD configuration information element.

23. The method of claim 19, wherein the UE is in an RRC connected state.

24. The method of claim 19, further comprising receiving an RRC connection reconfiguration message as part of an RRC connection reconfiguration procedure.

25. The method of claim 19, wherein the TDD configuration information includes a TDD configuration indicator indicating numbers of UL subframes and DL subframes in a radio frame.

26. The method of claim 19, wherein the TDD configuration information identifies subframe configuration employed by a serving cell of the UE.

27. A user equipment (UE) comprising one or more hardware processors for configuring a Time Division Duplex (TDD) mode of a connected user equipment (UE) in a Long Term Evolution (LTE) network, the one or more hardware processors configured to:
   receive a dedicated signaling message exclusively dedicated for TDD configuration information, the TDD configuration information identifying resource allocation between uplink (UL) and downlink (DL), wherein the dedicated signaling message is received within a time window less than 640 milliseconds after a prior message indicating TDD configuration information; and
   automatically update the TDD mode of the UE in accordance with the UL/DL resource allocation identified by the TDD configuration information in the dedicated signaling message.

28. The user equipment of claim 27, wherein the dedicated signaling message is a radio resource control (RRC) connection reconfiguration message.

29. The user equipment of claim 27, wherein the radio resource control connection reconfiguration message includes a radio resource configuration common information element.

30. The user equipment of claim 29, wherein the radio resource configuration common information element includes a new TDD configuration information element.

31. The user equipment of claim 27, wherein the UE is in an RRC connected state.

32. The user equipment of claim 27, further comprising receiving an RRC connection reconfiguration message as part of an RRC connection reconfiguration procedure.

33. A method for configuring a Time Division Duplex (TDD) mode of a connected user equipment (UE) in a Long Term Evolution (LTE) network, comprising:
   identifying a TDD configuration information for the UE, the TDD configuration information identifying resource allocation between uplink (UL) and downlink (DL); and
   transmitting a dedicated signaling message that includes the TDD configuration information that automatically updates the TDD mode of the UE in accordance with the TDD configuration information in the dedicated signaling message, the dedicated signaling message exclusively dedicated for TDD configuration information, wherein the dedicated signaling message is transmitted within a time window less than 640 milliseconds after a prior message indicating TDD configuration information.

34. The method of claim 33, wherein the dedicated signaling message is a radio resource control (RRC) connection reconfiguration message.

35. The method of claim 34, wherein the radio resource control connection reconfiguration message includes a radio resource configuration common information element.

36. The method of claim 35, wherein the radio resource configuration common information element includes a new TDD configuration information element.

37. The method of claim 33, wherein the UE is in a radio resource control (RRC) connected state.

38. The method of claim 33, further comprising transmitting an RRC connection reconfiguration message is part of an RRC connection reconfiguration procedure.

39. An apparatus for configuring a Time Division Duplex (TDD) mode of a connected user equipment (UE) in a Long Term Evolution (LTE) network, the apparatus comprising one or more hardware processors configured to:
   identify a TDD configuration information for the UE, the TDD configuration information identifying resource allocation between uplink (UL) and downlink (DL); and
   transmit a dedicated signaling message that includes the TDD configuration information that automatically updates the TDD mode of the UE in accordance with the TDD configuration information in the dedicated signaling message, the dedicated signaling message exclusively dedicated for TDD configuration information, wherein the dedicated signaling message is transmitted within a time window less than 640 milliseconds after a prior message indicating TDD configuration information.

40. The apparatus of claim 39, wherein the dedicated signaling message is a radio resource control (RRC) connection reconfiguration message.

41. The apparatus of claim 40, wherein the radio resource control connection reconfiguration message includes a radio resource configuration common information element.

42. The apparatus of claim 41, wherein the radio resource configuration common information element includes a new TDD configuration information element.

43. The apparatus of claim 39, wherein the UE is in a radio resource control (RRC) connected state.

44. The apparatus of claim 39, further comprising transmitting an RRC connection reconfiguration message is part of an RRC connection reconfiguration procedure.

* * * * *

UNITED STATES PATENT AND TRADEMARK OFFICE
CERTIFICATE OF CORRECTION

PATENT NO. : 8,923,274 B2
APPLICATION NO. : 13/210066
DATED : December 30, 2014
INVENTOR(S) : Yiping Wang and Jun Li Page 1 of 1

It is certified that error appears in the above-identified patent and that said Letters Patent is hereby corrected as shown below:

In the Claims

Column 17, Line 63, In Claim 7, after "Evolution" delete "the".

Signed and Sealed this
Second Day of June, 2015

Michelle K. Lee
*Director of the United States Patent and Trademark Office*